Figure 3:
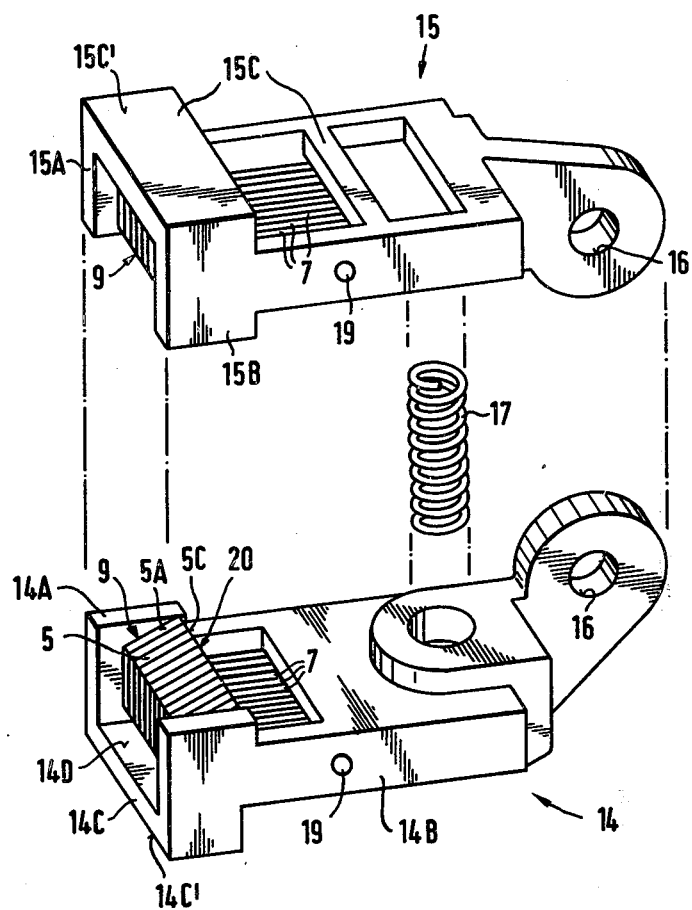

United States Patent [19]

Undin

[11] 4,197,768
[45] Apr. 15, 1980

[54] DEVICE FOR STRIPPING THE SHEATHING FROM THE ENDS OF INSULATED ELECTRICAL CONDUCTORS

[75] Inventor: Hans Undin, Akersberga, Sweden

[73] Assignee: C. A. Weidmüller K.G., Detmold, Fed. Rep. of Germany

[21] Appl. No.: 916,068

[22] Filed: Jun. 16, 1978

[51] Int. Cl.² ............................................. H02G 1/12
[52] U.S. Cl. .................................................. 81/9.5 A
[58] Field of Search ......................... 81/9.5 R, 9.5 A; 30/90.1

[56] References Cited
U.S. PATENT DOCUMENTS 3,422,708  1/1969  Bieganski ............................. 81/9.5 A
3,703,840  11/1972  Kauf .................................... 81/9.5 R Primary Examiner—James G. Smith
Attorney, Agent, or Firm—Toren, McGeady and Stanger

[57] ABSTRACT

A device for stripping the insulating sheathing from electrical wire conductors includes a pair of jaws formed of a stack of resilient blades having at least one leg which has an end formed with a cutting projection, the cutting projections being aligned to form a cutting edge when the blades are assembled in a stack to form one of two stripping jaws for the device. The blades of the jaws will exhibit different flexion characteristics depending upon the shape and configuration of the blades which may be in accordance with one of several aspects of the invention.

12 Claims, 13 Drawing Figures

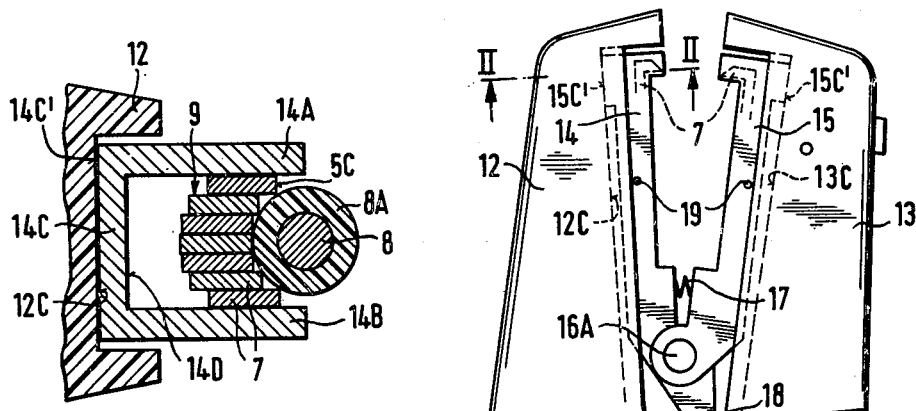
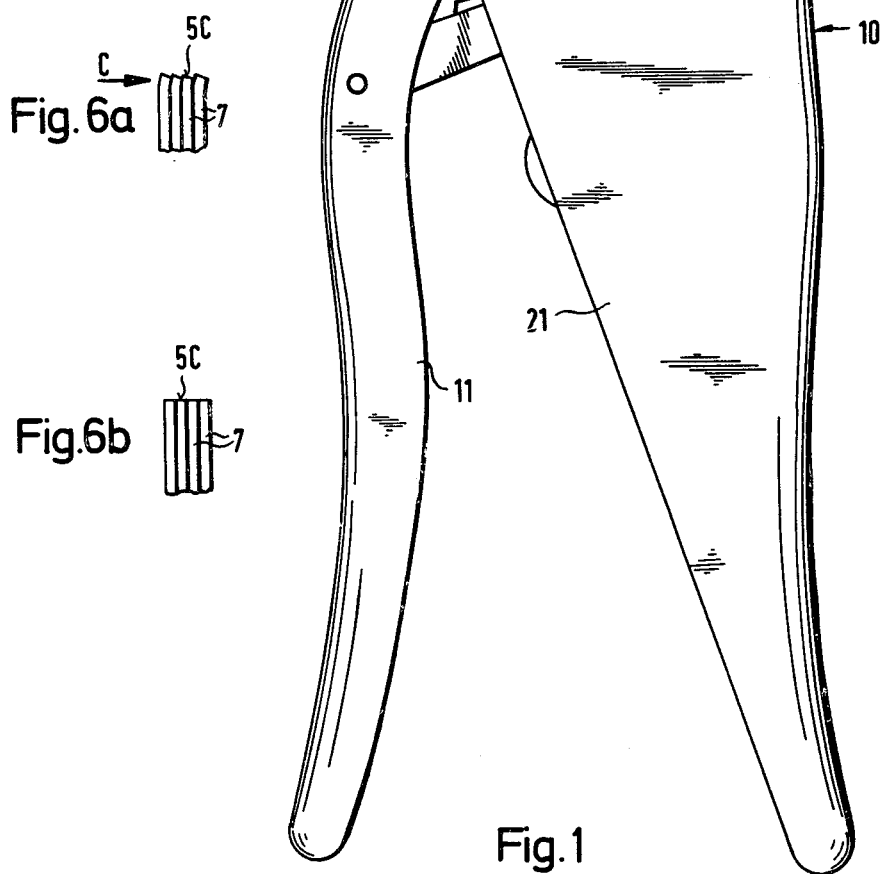

DEVICE FOR STRIPPING THE SHEATHING FROM THE ENDS OF INSULATED ELECTRICAL CONDUCTORS

This invention relates to devices for stripping the sheathing from the ends of insulated electrical conductors such as wires and cables. In particular, the invention relates to that kind of device which comprises a pair of cutting and stripping jaws for receiving the conductor, each jaw comprising a stack of resiliently biased blades, and each blade having at least one leg which, at the outer periphery of its front end, is provided with a cutting projection defined by two flanks meeting at an angle to form the top of the projection, the tops of all the cutting projections in the stack aligning into one cutting edge. Means are further provided for closing the jaws together. The cutting edge in each jaw conforms to different shapes and/or dimensions of the conductor inserted between the jaws, as the legs of the individual blades are flexed in varying degrees, (e.g. those which are pressed against the central portion of a circular cross-section of a conductor, are flexed most).

Two types of devices of this kind are known. In one type, such as is described in, for example, German Offenlegungsschrift No. 1,640,632 and in U.S. Pat. No. 3,596,541 (the embodiment of FIGS. 2 and 3), a separate resilient element, defined by a block of elastomeric material such as rubber or the like, is provided, which acts on the whole stack of blades, the individual blades or laminae having no inherent resiliency and being arranged for free movement, translational or pivotal, against the urging action of the elastomeric block. One of the disadvantages of this arrangement is that the elastomeric material obviously ages faster than other parts of the device, which are conventionally of metal.

In the second type, described in, for example, German patent specifications Nos. 1,102,842 and 1,665,298 and in U.S. Pat. No. 3,596,541 (the embodiment of FIG. 4), each individual blade in the stack is inherently resilient, preferably (as described in German patent specification No. 1,665,298 and U.S. Pat. No. 3,596,541) in such a way that it is U-shaped and has legs of different lengths, the longer leg being provided at its front end with the cutting projection, and the outer edge of the shorter leg forming a contact edge which bears against the inner face of the respective jaw. The stack of blades may be either arranged in a stationary manner on the inner face of a conventional jaw (as shown in German patent specification No. 1,665,298), or the stack may define one jaw of a pair of inner jaws which are located within an outer pair of clamping jaws and arranged for displacement by a pulling means in the axial direction of an inserted conductor (as shown in U.S. Pat. No. 3,596,541).

Both types of arrangements have the common disadvantage that there is no provision of an automatic variation of the resilient force acting on the blade, or at least a definite limit for the resilient flexure of the blade leg having the cutting projection, for use of the device with conductors of different diameters. It will be readily recognised that a conductor with a greater diameter generally also has a thicker insulating sheathing, thus requiring greater force to make the cutting projections penetrate therein, and that old and hard sheathings may bend the blade legs rather than allow the cutting projections to penetrate therein.

The problems associated with this disadvantage are reduced by a device in accordance with the invention, which is provided with inherently resilient blades, each having at least one integral abutment means, which is located at the front end of the blade and adapted to apply to a leg of the blade which carries a cutting projection, upon a predetermined flexion thereof, a force counter-acting the flexure of the leg. The predetermined flexion may be equal to zero or have a value greater than zero.

As used herein, the term "front" means the direction from which a conductor is inserted into the device, the term "rear" means the opposite direction, the term "inner" means the side which is directed towards an inserted conductor, and the term "outer" means the opposite side.

If the leg carrying the cutting projection is inherently resilient, the abutment means can be adapted to offer a rigid support upon the predetermined flexion, i.e. to act as a fixed stop causing a resistance which completely prevents further flexion. The abutment means may however expediently be arranged to be inherently resilient, so as to apply a resilient force to the leg, which resilient force may be either the only resilient force acting on the blade, or a resilient force which is additional to another inherent resilient force on the blade.

In the first named case, the leg of the blade may expediently be arranged in the appropriate jaw in a pivotal manner. In the second case, the abutment means can be arranged so that its additional resilient force acts either from the initition of flexion of the leg, concurrently with the other inherent resilient force of the blade (i.e. it begins to act at a predetermined flexion equal to zero), or it may commence at a later stage to act as a reinforcing factor (i.e. at a predetermined flexion greater than zero), thus endowing the blade with a two-stage action.

In a device wherein each blade has two legs in a substantially U-shaped formation, the first leg being provided in the above manner with the cutting projection, and the second leg being adapted for fixing the blade, the abutment means may conveniently be disposed at the inner periphery of at least one of the two legs. The second leg may expediently be substantially the same length as the first leg, and may be adapted to act, at its front end, as an abutment means. Furthermore, the means (which may be a contact edge or pin holes) for fixing the blade can be confined to the rear portion of the second leg and the front portion may be raised relative to the rear portion in a direction towards the first leg, and thus form a resilient abutment means. The raised front portion may advantageously have a substantially arcuate shape.

A blade having two legs may conveniently be provided with a rearward extension extending from the connection between the two legs, the blade thus having the shape of a letter "Y". There may conveniently be provided in the rear portion of each blade, (i.e. in the rear portion of the extension, if provided), at least one hole for at least one pin for assembling all the blades of one stack. By means of this pin, the stack of blades may be attached to a pulling means and thus itself form one of the cutting and stripping jaws (in analogy to the teaching of U.S. Pat. No. 3,596,541), or the stack may be anchored in a jaw by the pin, and thus form the inner part of the jaw, which may in a conventional manner, be fixedly attached to a handle (in analogy to the teaching of German patent specification No. 1,665,296). Preferably however, the cutting and stripping jaws form an inner pair of jaws, which are located within two clamping jaws defining an outer pair of jaws, for displacement therein in the axial direction of an inserted conductor with the aid of a pulling means, and each cutting and stripping jaw is preferably substantially box-shaped and has side walls and, at the outer portion, at least a partial bottom wall. A stack of blades (with or without an abutment means) is arranged in the box-shaped jaw in such a manner that its outer blades are guided by the inner faces of the side walls, the inner face of the bottom wall being adapted to give support to any means which causes the resilient force by which the blades are biased, and the outer face of the bottom wall being adapted to be guided by an inner face of the juxtaposed outer clamping jaw during the displacement of the inner jaws in the outer jaws.

It will be readily understood that in order to obtain a clean cut into the insulating sheathing, the cutting edge of each cutting jaw has to form a sharp line. This cutting edge, however, comprises, a plurality of individual cutting projections, one on each blade in the stack.

Blades of both the types mentioned above are generally produced by stamping-out from a metal sheet, preferably a steel sheet. It will be readily appreciated that protruding portions, such as the tops of the cutting projections, can easily be slightly bent in the direction of the punching force. When consequently assembled into a stack, the tops of the cutting projections do not form a straight line, but a line which in enlargement forms a saw-tooth shape, as will be explained in more detail later. The same applies of course also to a projection which may be provided on the inner edge of the legs to define an abutment.

This disadvantage is overcome by a method in accordance with a further feature of the invention, in which the individual blades are stamped-out with a finish allowance at at least one of their critical edges, whereupon the individual blades are assembled to form a stack and the finish allowances on all the blades are cleared-off simultaneously by stock removal, preferably by grinding, on the whole assembled stack. Preferably, the front flank of the cutting projection is treated in this manner, but also any functional edge of an abutment means, or the contact edge etc., may conveniently be produced in this way. It will be readily understood that this method can also be used advantageously for producing the cutting projections and/or contact edges of the blades described in any of the previously named patent specifications, which have no abutment means and/or are not inherently resilient.

Figure 4A:
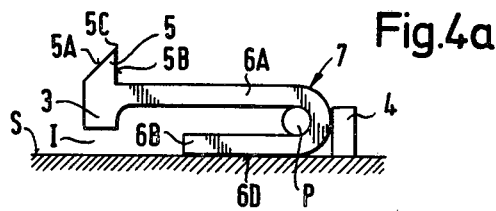
Figure 4B:
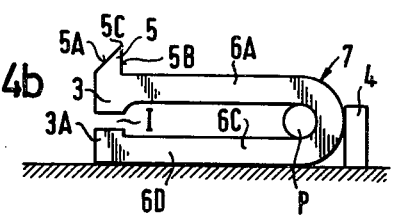
Figure 4C:
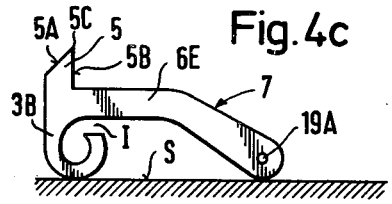
Figure 4D:
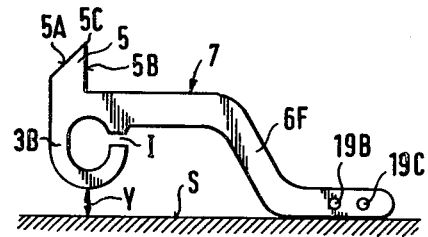
Figure 4F:
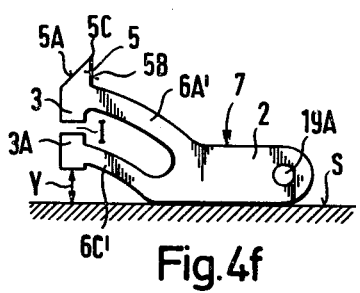
Figure 4E:
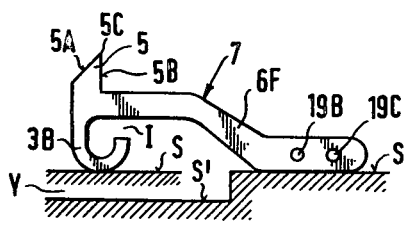
Figure 5:
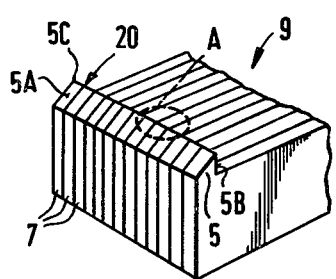
Figure 4G:
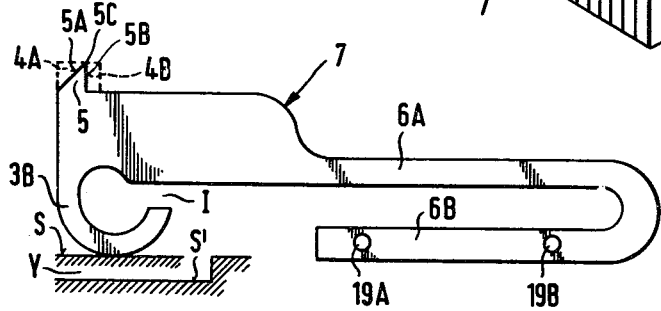

The invention will now be described by way of example with reference to the accompanying drawings, in which:

FIG. 1 is a schematic side view of a device in accordance with the invention for stripping the sheathing from insulated conductors, FIG. 2 is a schematic cross-section along the line II—II in FIG. 1, on a larger scale, FIG. 3 is an exploded view of the cutting and stripping jaws of the device of FIG. 1, on a smaller scale, FIGS. 4a to 4g are side views of various embodiments of blades with abutment means, FIG. 4g also illustrating a method of producing a cutting edge in accordance with the present invention, FIG. 5 is a perspective view of the cutting edge, and FIGS. 6a and 6b are plan views of a cutting edge produced in a conventional manner and a cutting edge produced in accordance with the present invention respectively.

Referring to FIGS. 1, 2 and 3, a pliers-type device 10 for stripping the insulating sheathing 8A (FIG. 2) from an electrical conductor 8 has two handles 11, 21 and two outer clamping jaws 12, 13. Two inner cutting and stripping jaws 14, 15 are arranged in the outer clamping jaws 12, 13, the jaws 14, 15 being pivotally connected together by a pivot tap 16A and held apart by a coil spring 17. The jaws 14, 15 are together displaceable in the outer jaws 12, 13 by a pulling means 18 operated by the handle 11. The detailed construction of this stripping device is described in our U.S. Pat. No. 3,915,037 and co-pending patent application No. 740,833.

Each of the inner jaws 14, 15 is defined by a box-like formation with side walls such as 14A and 14B and, at the outer portion, with a partial bottom wall 14C or 15C which is adapted to slide along guiding face 12C or 13C in the outer jaw 12 or 13. It will be readily understood that the bottom wall 14C or 15C may be continuous, but need not be so, as is evident from FIG. 3, so long as it comprises an external face 14C' or 15C' adapted to glide along the guiding face 12C or 13C of the outer jaw 12 or 13, and an internal face such as 14D adapted to support either an abutment, as will be described with reference to FIGS. 4a to 4g, or a resilient block, or one leg of a two-legged blade in accordance with known arrangements of such blades. In each of the inner jaws 14 or 15 a stack 9 (FIG. 5) of blades or laminae 7 is arranged and the peripheral blades of the stack are guided along the inner faces of the side walls e.g., 14A, 14B (FIG. 2). Each blade has a cutting projection 5 (FIG. 5) defined by a front flank 5A and a rear flank 5B. The flanks 5A, 5B meet at an angle at a top 5C, and the tops 5C of all the blades in a stack 9 align to form a cutting edge 20. When the jaws 14, 15 are closed upon a conductor inserted therebetween, the cutting edge 20 is deformed into a shape such as in shown in FIG. 2, and upon further closing of the jaws 14, 15, the cutting projections 5 penetrate into the sheathing 8A. This process is already known.

The blades 7 are provided with at least one abutment means, which may be such as is shown in any one of FIGS. 4a to 4g. In FIG. 4a, the blade 7 is inherently resilient, and has a longer leg 6A and a shorter leg 6B. The longer leg 6A bears the cutting projection 5 and the outer edge 6D of the shorter leg 6B acts as a contact edge bearing against a support face S such as the inner bottom face 14D (FIG. 2) of the inner jaw 14. A pin P, for instance the pin 19 of FIG. 1, and a stop 4 hold the blade 7 in place in a cutting and stripping jaw such as, e.g., 14 or 15 of FIG. 1. At the front end of the longer leg 6A, at the inner edge thereof, an abutment 3 is formed, which prevents further flexion of the leg 6A when the abutment meets the support face S, i.e. when the gap I is closed. A similar type of arrangement is shown in FIG. 4b, in which the second leg 6C has substantially the same length as the first leg 6A and is provided with an abutment 3A which co-operates with the abutment 3. In the embodiments of FIGS. 4a and 4b, the inherent resiliency of the blade 7 is derived from the presence of the two legs 6A and 6B or 6C, and in particular from the bend between them. It will be realised that the resistive force due to the abutment 3 (or the abutments 3 and 3A) begins to act when the leg 6A has been flexed by a predetermined extent resulting in the closing of the gap I.

In the embodiment of FIG. 4c, the blade 7 has a single leg 6E which is provided with a inherently resilient abutment 3B and with a hole 19A for a pin such as the pin 19 of FIG. 1, on which the blade 7 can be pivotally mounted. The inherent resilient force of the blade is due only to the resilient force of the abutment 3B, and thus begins to act at a predetermined flexion of the leg 6E which is equal to zero. At a second predetermined flexion value, viz., when the gap or space I closes in consequence of the deformation of the resilient abutment 3B, the latter works as a rigid abutment in the same way as in the embodiments of FIGS. 4a and 4b.

In the embodiments of FIGS. 4d and 4e, the leg 6F has an inherent resiliency due to its profile. The resiliency of the abutment 3B is additional thereto and acts either from the beginning of the flexion (i.e. when the predetermined flexion is equal to zero, as in FIG. 4e) or begins to act later (as in FIG. 4d). In the embodiment of FIG. 4d, the blade 7 is, during a first flexion stage, affected only by the inherent resiliency of the leg 6F, then, during a second stage, when the gap Y has closed, by the combined resiliency of the leg 6F and the abutment 3B, and finally, when the gap I has also closed, it is stopped in the same way as the leg 6A in FIG. 4a or 4b. It will be appreciated that by fixing the blade 7 with the aid of two pins passing through holes 19B and 19C, the function of a contact edge and of a support face S becomes redundant, the support face S however being necessary for the abutment 3B. It will be further appreciated that the same two-stage mode of function can also be achieved by transferring this support face S, or at least its front portion, to the position S', as shown in FIG. 4e.

Referring to FIG. 4f, both legs 6A' and 6C' are substantially equally long and arcuate in shape. The whole leg 6C', by virtue of its raised front part, acts as a resilient element. The gaps I and Y have the same significance as in the embodiment of FIG. 4d. The blade 7 has a rearward extension 2 in which a hole 19A is arranged. It will be readily understood that two holes such as those shown at 19B and 19C in the embodiment of FIG. 4d, can alternatively be provided, and that the rear portion of support face S then becomes superfluous. Similarly, in the embodiments of FIGS. 4a, 4b and 4g, two holes 19A and 19B can replace the function of the contact edge and the rear portion of the support face S, as shown in FIG. 4g.

FIG. 4g shows a combination of features shown in FIGS. 4a and 4e. Depending upon whether the support face is located as shown at S, or at S', the resilient force of the abutment 3B begins to act from a predetermined flexion equal to zero, or equal to a value greater than zero.

FIG. 4g further illustrates a method of producing blades in accordance with the invention. Reference is made to FIGS. 6a and 6b which show on a large scale the area marked by the dotted circle A in FIG. 5. When stamping or punching out the individual blades in the direction of the arrow C in FIG. 6a in a conventional manner, a cutting edge 5C as shown in FIG. 6a is achieved when the blades are assembled to form a stack. If, however, when stamping the individual blades, a finish allowance such as 4A or 4B (FIG. 4g) is added where the flanks 5A and 5B of the cutting projection 5 are to lie, and these allowances then are removed by grinding or the like on the whole assembled stack 9 (FIG. 5), the resulting edge will be shown in FIG. 6b. It will be understood that in the same manner the edges defining, for example, the gap I can also be produced.

From the above it will be appreciated that the abutment means at the front of each inherently resilient blade may have one of the following functions:

(i) It may be rigid, and serve as an end stop upon a predetermined flexion of the leg of the blade carrying the cutting projection which is greater than zero, or
(ii) It may be inherently resilient, and
  (a) define the only means of inherent resiliency of the blade, the leg being mounted for free pivotal movement,
  (b) define a means of resiliency which acts from the start of flexion of the leg, i.e., upon a predetermined flexure equal to zero, concurrently with an inherent resiliency of the leg,
  (c) define a means of additional resiliency, acting with the inherent resiliency of the leg upon a predetermined flexion thereof greater than zero,
  (d) in addition to any one of the modes of (a) to (c), it may also define an end stop upon a predetermined greater flexion.

In the drawings, FIGS. 4a and 4b are illustrative of case (i), FIG. 4c of case (ii)-(a), FIGS. 4e and 4g of case (ii)-(b), FIGS. 4d and 4f of case (ii)-(c) and FIGS. 4c–4g of case (ii)-(d).

From examination of FIG. 6a it will be evident that the bent tops which are received with the conventional method, impair the independent movability of the singular blades, as the flexure of one blade is liable to draw an adjacent blade with it and so on for the other adjacent blades.

What we claim is:

1. A device for stripping the sheathing from an insulated electrical conductor, comprising a pair of cutting and stripping jaws for receiving the conductor, each jaw comprising a stack of blades ; each blade having at least one resiliently biased leg which, at the outer periphery of its front end, is provided with a cutting projection defined by two flanks meeting at an angle in a common top, the tops of all the cutting projections in the stack aligning into one cutting edge, wherein the jaws form an inner pair of jaws which are located within two clamping jaws forming an outer pair of jaws, the inner pair of jaws being arranged for displacement therein in the axial direction of an inserted conductor, and wherein each cutting and stripping jaw is substantially box-shaped and has side walls and, at the outer portion, at least a partial bottom wall, the stack of blades being arranged therein so that its peripheral blades are guided by the inner faces of the side walls, the inner face of the bottom wall being adapted to support means for biasing the blades, and the outer face of the bottom wall being adapted to be guided by an inner face of the juxtaposed outer clamping jaw during the displacement of the inner jaws in the outer jaws.

2. A device for stripping the sheathing from an insulated electrical conductor, comprising a pair of cutting and stripping jaws for receiving the conductor, each jaw comprising a stack of inherently resilient blades each blade having at least one leg which is provided at the outer periphery of its front end with a cutting projection defined by two flanks meeting at an angle in a common top, the tops of all the cutting projections in the stack aligning into one cutting edge, and means for closing the jaws together, the cutting edge in each jaw, by varying deflexion of the said at least one leg on each individual blade, being adapted to conform to different conductor shapes and dimensions, wherein there is provided at least one resilient abutment means which is integral with the blade and located at the front end thereof, the abutment means being adapted to apply to the blade leg, upon a predetermined flexion thereof, a resilient force counteracting the deflexion. in the outer jaws.

3. A device as claimed in claim 2, wherein the blades of the stack are pivotally mounted in the jaws and the resilient force of the abutment means is the only biasing means for each blade.

4. A device as claimed in claim 2, wherein the leg has an inherent resiliency and the abutment means is adapted to apply an additional resilient force.

5. A device as claimed in claim 4, wherein the abutment means is adapted to apply the additional force from the initiation of the flexion of the leg.

6. A device as claimed in claim 4, wherein the abutment means is adapted to start to apply the additional force after a predetermined flexion of the leg which is greater than zero.

7. A device as claimed in claims 4, 5 or 6, wherein each blade has two legs in a substantially U-shaped formation, the first leg being provided with the cutting projection, and the second leg being adapted for fixing the blade, wherein the abutment means is disposed at the inner periphery of at least one of the two legs.

8. A device as claimed in claim 7, wherein the second leg has substantially the same length as the first one and is adapted to act at its front end as the abutment means.

9. A device as claimed in claims 2, 4 or 6 wherein each blade has two legs and a rearward extension extending from the connection between the two legs, and the means for fixing the blade is located at the rearward extension and a portion of the second leg is raised relative to the rearward extension in a direction towards the first leg, thus forming a resilient abutment means.

10. A device as claimed in claim 9, wherein the raised second leg has a substantially arcuate shape.

11. A device as claimed in claim 9 wherein the raised second leg in co-operation with a support face forms an abutment means which after a predetermined flexion of the first leg prevents a further flexion thereof.

12. A device as claimed in claim 2, wherein at least one hole for at least one pin for assembling all the blades of one stack is situated in the rear portion of each blade.

* * * * *